Dec. 23, 1969            A. RUFLI            3,486,101
JOLT-FREE STARTING ARRANGEMENT FOR ELECTRICAL
DRIVE HAVING A MECHANICAL BRAKE
Filed April 1, 1966
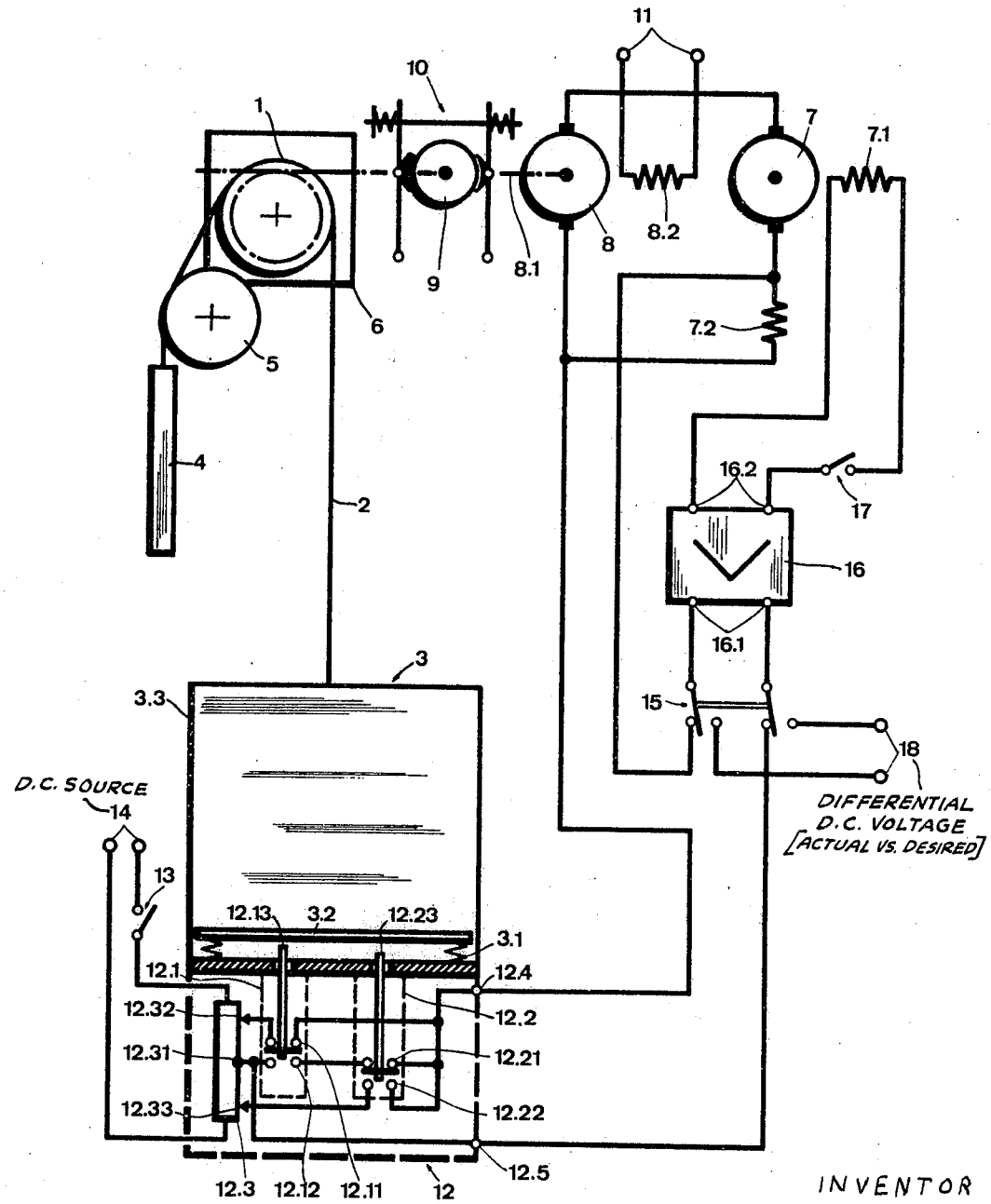
INVENTOR
ANTON RUFLI United States Patent Office 3,486,101
Patented Dec. 23, 1969

3,486,101
JOLT-FREE STARTING ARRANGEMENT FOR ELECTRICAL DRIVE HAVING A MECHANICAL BRAKE
Anton Rufli, Meggen, Lucerne, Switzerland, assignor to Inventio Aktiengesellschaft Hergiswil NW, Switzerland
Filed Apr. 1, 1966, Ser. No. 539,490
Claims priority, application Switzerland, Apr. 1, 1965, 4,647/65
Int. Cl. H02p 1/04
U.S. Cl. 318—431
4 Claims

ABSTRACT OF THE DISCLOSURE

In an electric drive including an electric driving motor, a source of potential connected to the motor, a worm reduction gearing connecting the motor to a load and a releasable mechanical brake, a starting arrangement is operable to counteract the torque, exerted by the load on the brake, by an initial torque exerted by the driving motor prior to release of the brake. The driving arrangement includes measuring means measuring the load in predetermined steps and converting the measurements into an electrical variable which varies in accordance with the steps. Means are provided to apply the electrical variable to influence the source of potential for the motor so that the motor develops the initial torque, and means are provided for subsequently releasing the brake.

This invention relates to arrangements for obtaining a jolt-free start of an electrical drive provided with a releasable mechanical brake and, more particularly, to a novel and improved control arrangement of the mentioned type whereby the loading on the mechanical brake, prior to its release, is relieved by a torque exerted by the driving motor and proportional to the effective loading acting on the brake.

With electrical lifting devices, wherein, even when at standstill, the load still exerts a torque on the driving motor, there usually occurs either an advance or a backsliding of the load, depending on the direction of operation, in starting the device and between the moment of releasing the mechanical brake and the moment when the driving motor torque is effective on the device to be lifted.

A known arrangement for avoiding such advance or backsliding is disclosed in U.S. Patent No. 3,244,957, issued Apr. 5, 1966. In the arrangement disclosed in this patent application, the torque absorbed by the mechanical brake is measured, with respect to magnitude and direction, prior to starting of the motor. The measured torque is then converted into an electrical quantity and caused to act on the electric power supply for the driving motor. Thereby, the driving motor is caused to develop a torque, for relieving the load on the brake, before the brake is released. The brake is then released and the acceleration of the motor commences.

The arrangement of the mentioned U.S. patent includes a power or torque measuring instrument which is operatively connected to the mechanical brake and to at least one amplifier. This measuring instrument converts the torque, absorbed by the mechanical brake when applied, into an electrical quantity which controls the power source of the driving motor through the amplifier.

In driving devices wherein the load is driven from the motor through a reduction gear, the friction of the gear absorbs at least a portion of the load. The mechanical brake, located on the motor side of the reduction gear, is thus loaded only by that portion of the load which exceeds the momentum due to friction of the reduction gearing. With a fixedly adjusted standstill torque of the motor, it is thus possible, without changing the loading of the brake, to vary the over-all load within a range extending from the difference between the motor torque and the maximum friction momentum of the reduction gear, as one limit, and the sum of the motor torque and the maximum friction momentum of the reduction gear, as the other limit.

The arrangement of the mentioned U.S. patent just described does not take this factor into account and is accordingly not suitable for driving devices in which a reduction gear is interposed between the motor and the driven device.

An object of the present invention is to provide an arrangement for obtaining a jolt-free start of an electrical drive having a mechanical brake and which is applicable to such driving arrangements in which a reduction gear in interposed between the motor and the driven device.

Another object of the invention is to provide such an arrangement including a load measuring device which measures the load in graduated steps.

A further object of the invention is to provide an arrangement of this type, particularly adaptable to elevators, and in which a load measuring device is provided which provides an adjustable multi-stage measurement of the load in the cabin of the elevator.

Yet another object of the invention is to provide an arrangement of the type just mentioned in which, when the brake is applied, the measuring device imparts, to a known torque control device for the driving motor, electrical quantities corresponding to the adjustable multi-stage values of the load.

For an understanding of the principles of the invention, reference is made to the following description of a typical embodiment thereof as illustrated in the accompanying drawing.

In the drawing:

The single figure is a schematic wiring diagram and mechanical diagram of the invention arrangement as applied to an elevator drive using the Ward-Leonard system.

While the invention as described hereinafter is applied to a particular example, involving a Ward-Leonard drive for an elevator, it should be understood that this particular example has been shown by way of illustration only and is not limiting with respect to application of the principles of the invention.

Referring to the drawing, a driving wheel or drum 1 has a supporting cable or rope 2 in frictional engagement therewith. An elevator cabin 3 is secured to one end of the cable 2, and a counterweight 4 is secured to the other end of the cable. The weight of counterweight 4 equals the weight of elevator cabin 3 when the latter is loaded with 50% of the maximum load. Cable 2 is also trained over a deviation or directing roller 5 which is an idler roller.

Drive wheel or drum 1 is secured on the worm gear shaft of a worm reduction gear 6 which is not self-locking. Worm reduction gear 6 is driven by a Ward-Leonard drive including a direct current generator 7 which is connected with a direct current motor 8. Motor 8 has a drive shaft 8.1 connected to the worm of worm reduction gear 6 and has a brake disk 9 secured thereon. A clamping-jaw-type brake 10, which is released during operation of the elevator by suitable brake release means, is operaitve on brake disk or drum 9.

D.C. motor 8 includes a winding 8.2 which is connected to terminals 11 of constant D.C. source of potential. The D.C. generator 7 includes a field winding 7.1 and a reversing pole winding 7.2, and is driven in a known manner by a three-phase motor which has not been illustrated.

Elevator 3 includes a movable floor 3.2 resting in cabin 3.3 on compression springs 3.1, and which moves, relative to the cabin 3.3, in accordance with the load on the floor 3.2. Movable floor 3.2 is operatively associated with the load measuring device 12 secured to cabin 3.3.

Device 12 comprises two switches 12.1, 12.2, each of which comprises back or off contacts 12.11, 12.21, respectively, front or on contacts 12.12, 12.22, respectively, and a movable switch plunger or circuit closer 12.13, 12.23, respectively. Load measuring device 12 further includes a potentiometer 12.3 which is connectable to a D.C. source 14 through a switch 13. Potentiometer 12.3 includes a fixed intermediate tap 12.31 and two adjustable taps 12.32, 12.33.

The output terminals of load measuring device 12 are indicated at 12.4 and 12.5. Output terminal 12.4 is connectable either through contacts 12.11 to tap 12.32, or through contacts 12.21 and 12.12 in series to tap 12.31, or through contacts 12.22 to tap 12.33, these being the taps of potentiometer 12.3. Output terminal 12.5 is connected to fixed tap 12.31.

Switches 12.1 and 12.2 are operated by movable floor 3.2 in accordance with the load, and arranged in such a manner that, in cooperation with potentiometer 12.3 and its associated contacts, they impart, to output terminals 12.4 and 12.5, voltages corresponding to predetermined loadings of floor 3.2. For example, the operating plunger 12.13 extends further in the direction of floor 3.2 than does the operating plunger 12.23 of switch 12.2, and thereby switch 12.1 is operated in advance of switch 12.2 upon an increase in the load on floor 3.2.

The relative potential of output terminals 12.4 and 12.5, which depends on the load in the elevator, serves as a desired torque value for a torque adjusting device and, for this purpose, is connected in opposition to the actual torque value appearing at the reversing pole winding 7.2 of generator 7 and which is proportional to the Ward-Leonard current and thus to the torque of motor 8. The differential value between the desired value and the actual value is applied to input 16.1 of amplifier 16 through a selectively operable reversing switch 15. The output 16.2 of amplifier 16 is connectatble to field winding 7.1 of generator 7 through a switch 17.

By means of selector switch 15, either the above-mentioned voltage difference for torque regulation, or a voltage applied to terminals 18 by a conventional speed regulating device, can be applied to the amplifier input 16.1.

The differential voltage value applied to terminals 18 is derived in the same manner as described and shown in Rufli et al U.S. Patent No. 3,393,773, issued July 23, 1968. In FIG. 2 of this patent, a desired voltage value is obtained by the means 12 and an actual voltage value is obtained by the means 13. The difference between these values is applied to the input of an amplifier 14, and the input terminals of amplifier 14 correspond to the terminals 18 of the drawing of the present application.

For the purposes of explanation, it will be assumed that, in the embodiment of the invention illustrated in the drawing, the adhesion friction of the worm reduction gear can absorb, as a maximum, the torque produced by one-sixth of the maximum cabin load. Since counterweight 4 balances 50% of this maximum cabin load, the load at standstill and with motor 8 deenergized may vary between one-third and two-thirds of the maximum cabin load without applying any loading to brake 9–10. For this reason, the load measuring device 12 is arranged in the following manner:

If and when the load in cabin 3 is less than ⅓ of the maximum permissible cabin load, both switches 12.1 and 12.2 are in the non-operated positions shown in the drawing. Output terminal 12.4 then has a potential which may be assumed to be positive with respect to that of output terminal 12.5. As soon as the load exceeds one-third of the maximum cabin load, floor 3.2 is depressed sufficiently to actuate plunger 12.13 of switch 12.1. The potential between output terminals 12.4 and 12.5 is then equal to zero, and this zero value is retained until the load exceeds two-thirds of the maximum cabin load. At this latter time, plunger or operator 12.23 of switch 12.2 is engaged by floor 3.2 and operated so that the potential at terminal 12.4 will be negative relative to that of terminal 12.5.

Taps 12.32 and 12.33 of potentiometer 12.3 are so adjusted that the corresponding desired value of potential at output terminals 12.4 and 12.5 causes a torque, in motor 8, which is opposite and equal to the torque absorbed by brake 10 at either zero load or maximum load, depending on the direction of operation, and with motor 8 deenergized.

In detail, the described arrangement opreates as follows:

At the start of a trip of the elevator, switches 13 and 17 are closed by the elevator control. Load measuring device 12 now has an output voltage which is dependent on the magnitude of the load present in the elevator cabin. Through the medium of selector switch 15, amplifier 16 and field winding 7.1 of D.C. generator 7, and by means of the voltage comparision between the voltage difference across output terminals 12.4 and 12.5 and the voltage produced across the commutating pole windings 7.2, the Ward-Leonard current is regulated. The motor torque corresponding to this current, together with the friction of the reduction gearing, assures that brake 10 is substantially unloaded or relieved of load.

The regulating circuit responds slowly, which assures that the motor torque is increased gradually. Amplifier 16 includes the usual stabilizing means for assuring that the transient phase for the torque regulation takes place without overshooting. After a certain time, after which the transient phase of the torque regulation has been terminated with certainty, switch 15 is actuated by the elevator control arrangement. Simultaneously, brake 10 is released and switch 13 is opened. When terminals 18 are connected to amplifier 16.1 by switch 15, the voltage across terminals 18, whose polarity is dependent on the direction of rotation, is applied to input 16.1. At the moment at which this changeover takes place, this voltage corresponds to the voltage required for controlling the elevator speed during a first portion of the elevator travel. The change from the stationary torque to the drive torque, owing to the slow response of the circuit, is smooth.

The invention is not limited to the particular embodiment shown and described. For example, the load measuring device may comprise further stages, and it is possible to use other driving systems than the illustrated Ward-Leonard drive.

While a specific embodiment of the invention has been shown and described in detail to illustrate the application of the principles of the invention, it will be understood that the invention may be embodied otherwise without departing from such principles.

What is claimed is:

1. In an electric drive including an electric driving motor, a source of potential connected to the driving motor, a worm reduction gearing connecting the driving motor to a load and releasable mechanical brake operatively associated with the driving motor; a starting arrangement operable to counteract the torque, exerted by the load on said brake when said drive is at a standstill, by an initial torque exerted by said driving motor prior to release of said brake, said starting arrangement comprising, in combination, a measuring device operative to measure the load in predetermined steps each corresponding to a respective magnitude of the load, and to convert the load measurements into an electrical variable which varies in accordance with said steps; torque adjustment means connected to said measuring device and to said source of potential and operable to control said source of potential in accordance with said electrical variable to energize said driving motor to develop said initial torque; and means operable, when said motor has developed said initial torque, to release said brake; said load comprising an elevator including a cabin and a cabin floor movable vertically relative to said cabin in accordance with the load on said cabin floor; said measuring device including a pair of switches successively operated upon relative downward movement of said cabin floor in accordance with the load on the latter; said pair of switches being included in an electric circuit connected between a source of potential and said torque adjustment means; said electric circuit further including a potentiometer having a pair of taps adjustable with respect to a neutral point, one of said taps being operatively associated with one switch and the other of said taps being operatively associated with the other switch, said taps being adjustable to determine the preselected value of output voltage applied by said electric circuit to said torque adjustment means 2. A lifting arrangement, as claimed in claim 1 in which said cabin floor is biased upwardly by springs; said switches including switch operators extending upwardly toward said cabin floor and engaged thereby, to operate said switches, as said cabin floor is depressed during increase of load thereon.

3. A lifting arrangement, as claimed in claim 1, including switch means operable to disconnect said load measuring device from said torque adjustment means responsive to release of said brake.

4. A starting arrangement for an electric drive, as claimed in claim 1, in which said mechanical brake is located between said motor and said worm reduction gearing.

References Cited

UNITED STATES PATENTS

| | | | |
|---|---|---|---|
| 2,847,091 | 8/1958 | Santini et al. | 187—29 |
| 3,244,957 | 4/1966 | Spiess et al. | 318—431 |

ORIS L. RADER, Primary Examiner

K. L. CROSSON, Assistant Examiner

U.S. Cl. X.R.

187—29; 318—436